June 30, 1936.  L. WYANT  2,046,143
CONTROLLING MECHANISM FOR INTERLOCKED RAILWAY SIGNALS AND SWITCHES
Filed Nov. 7, 1930  5 Sheets—Sheet 1
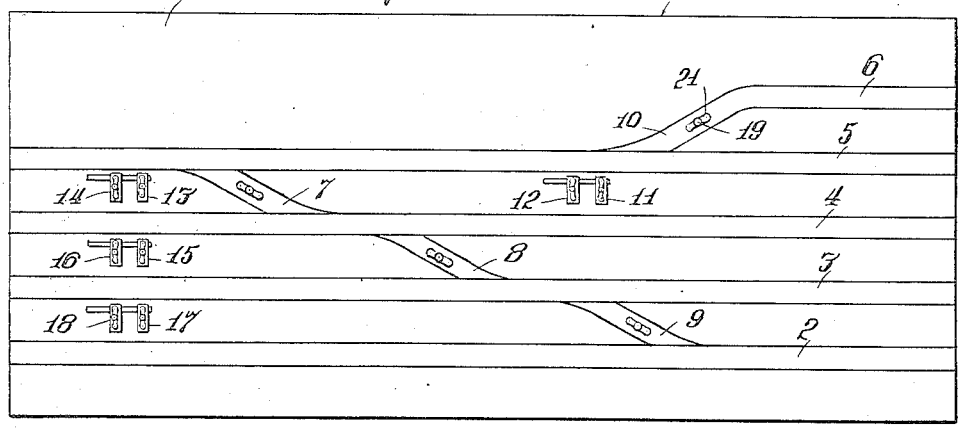
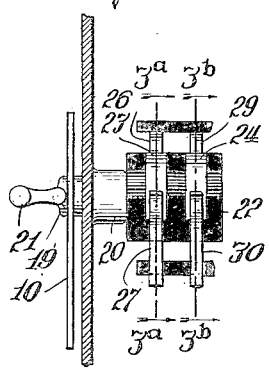
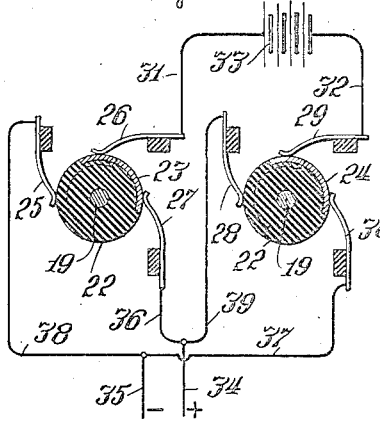
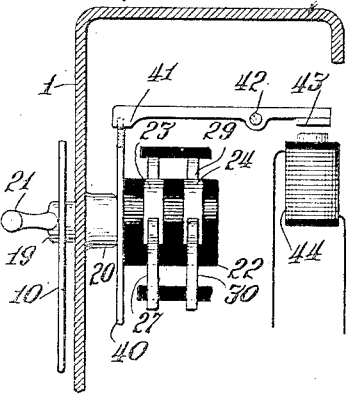
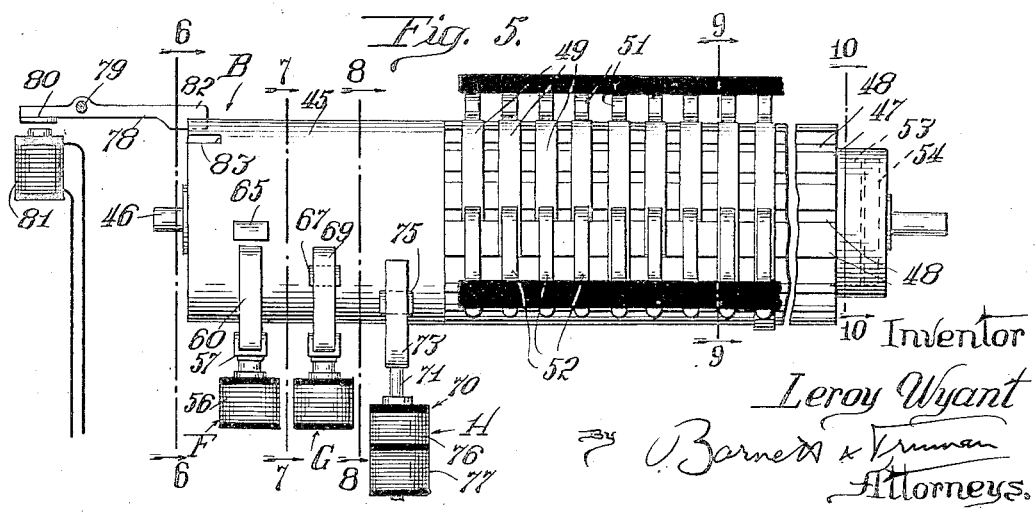
Inventor
Leroy Wyant
By Barnett & Truman
Attorneys.

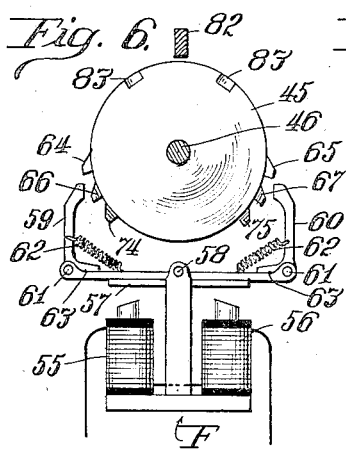
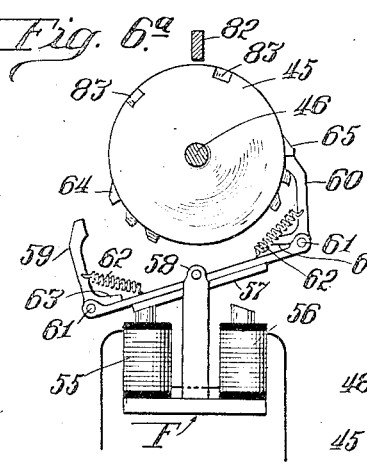
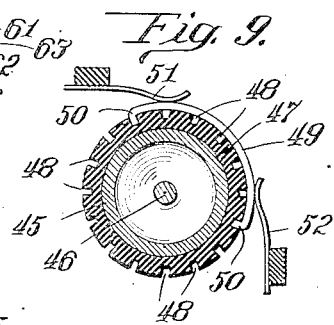
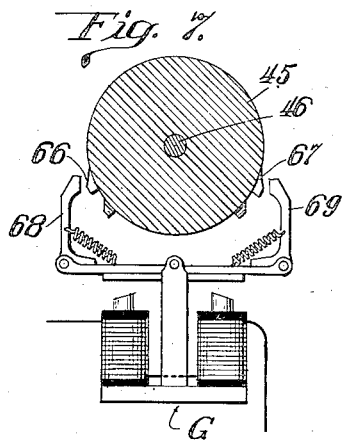
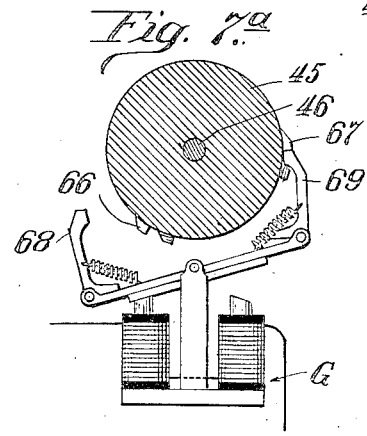
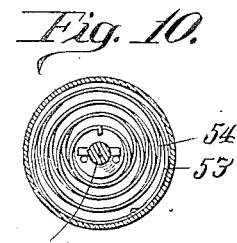
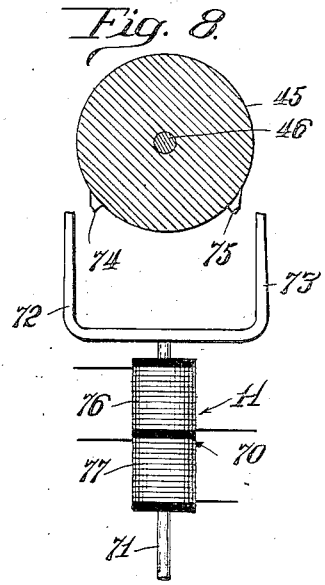
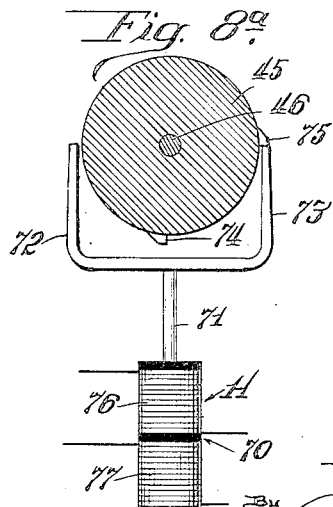
Inventor
Leroy Wyant June 30, 1936.  L. WYANT  2,046,143
CONTROLLING MECHANISM FOR INTERLOCKED RAILWAY SIGNALS AND SWITCHES
Filed Nov. 7, 1930  5 Sheets-Sheet 3
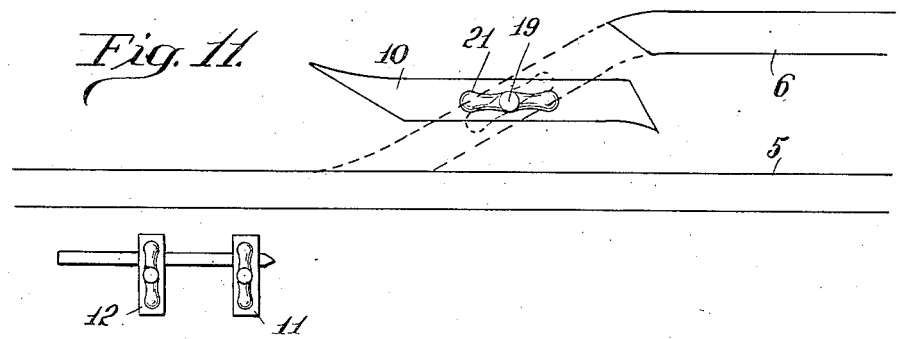
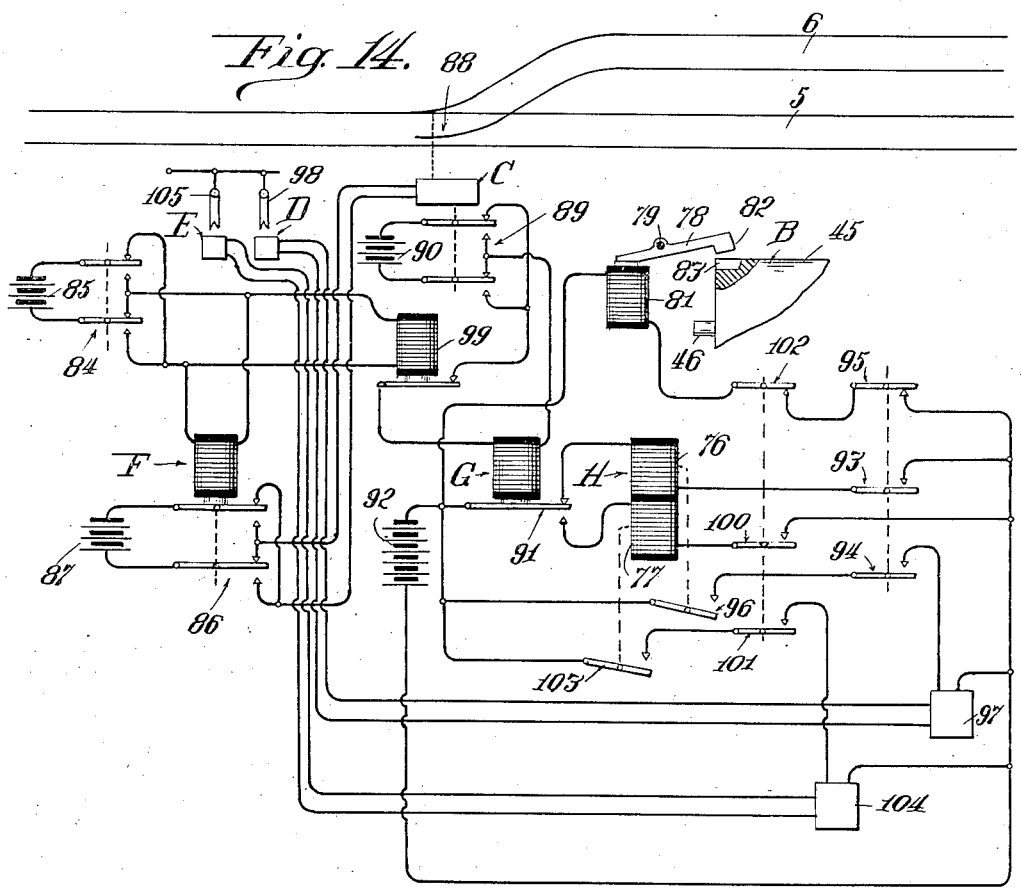
Inventor
Leroy Wyant
By Barnett & Truman
Attorneys

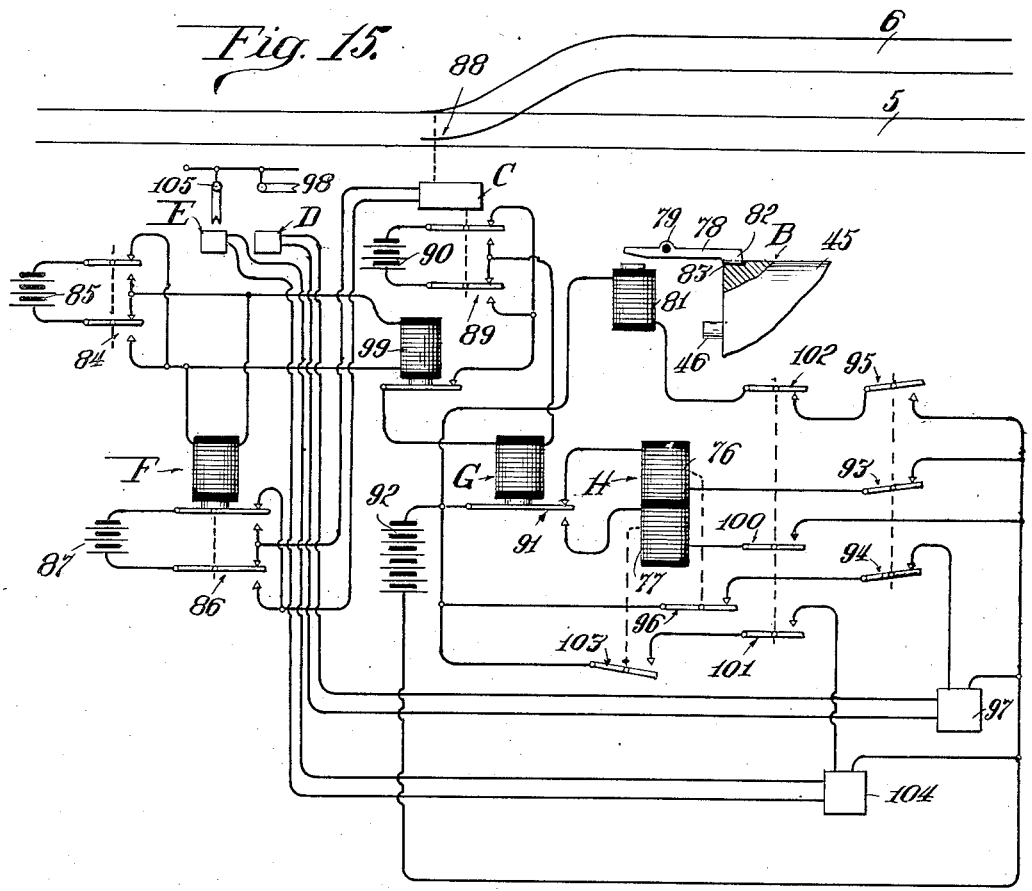

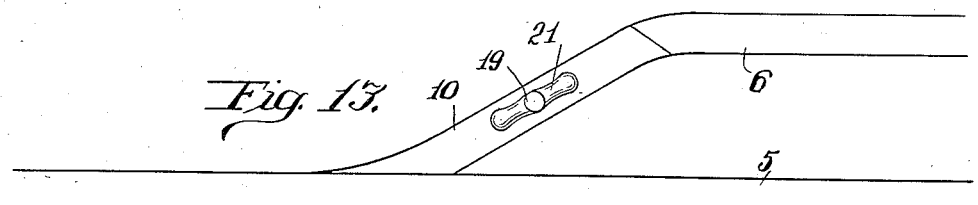
Fig. 13.
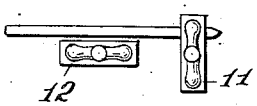
Fig. 16.
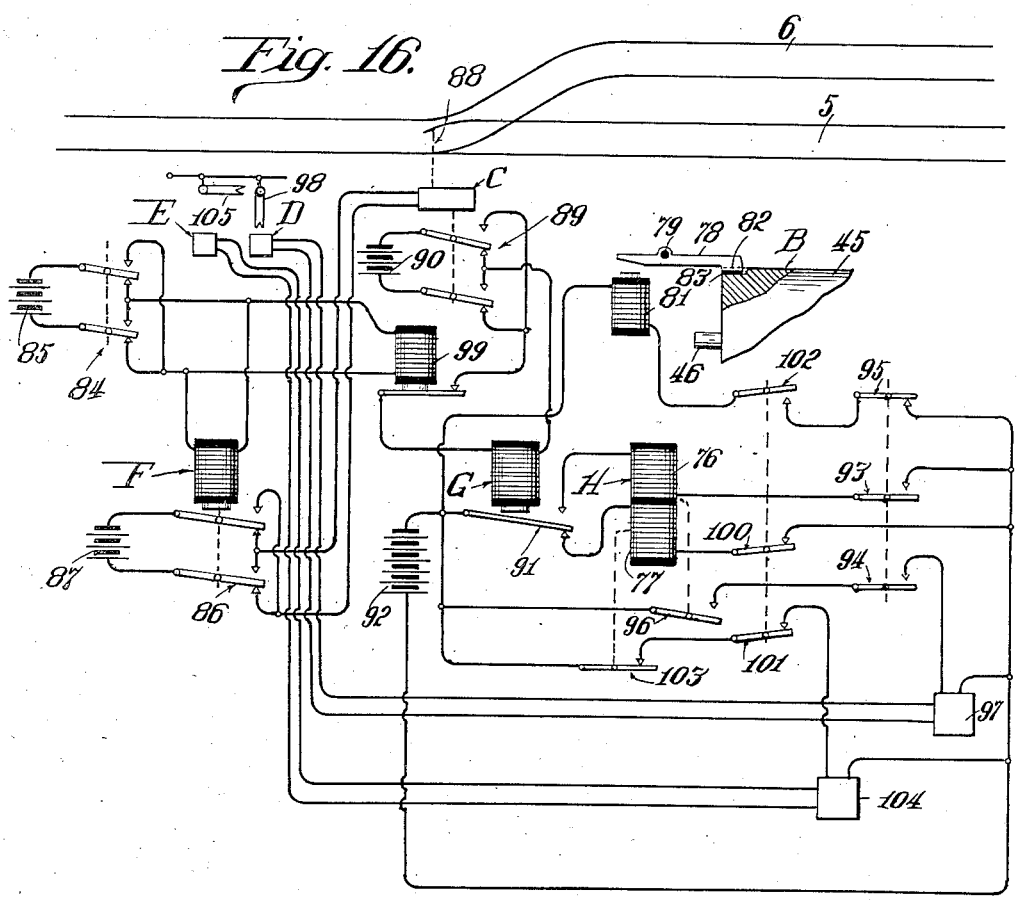
Inventor
Leroy Wyant
By Barnett & Truman
Attorneys Patented June 30, 1936

2,046,143

UNITED STATES PATENT OFFICE 2,046,143

CONTROLLING MECHANISM FOR INTERLOCKED RAILWAY SIGNALS AND SWITCHES

Leroy Wyant, Chicago, Ill., assignor to Associated Electric Laboratories, Inc., Chicago, Ill., a corporation of Delaware Application November 7, 1930, Serial No. 494,070

22 Claims. (Cl. 246—132)

This invention relates to an improved controlling mechanism for interlocked or power-operated railway switches and signals.

In modern railway practice, the track switches and the semaphore signals governing train movements over or past the switches are actuated either mechanically or electrically and controlled from a distance by an interlocking mechanism which compels a certain sequence of movements of the switches and signals. The present practice for such control necessitates the use of what is known as an interlocking machine that is housed in a cabin or tower adjacent the track system to be controlled so that the operator may have a view of the situation then existing on the tracks. This interlocking machine comprises a long series of levers and cooperating mechanism, and is often quite bulky and takes up considerable space that is provided at much expense and inconvenience. The making and breaking of the electric control circuits is accomplished in certain sequence by the operation of these levers, which are provided with interlocking mechanism so that any one particular lever cannot be operated until the proper prior operations have been accomplished. This interlocking machine is usually accompanied by what is termed a track model, which is mounted adjacent the machine and discloses a map or replica of the track lay-outs involving the track switches and signals governed by the levers of the machine. This track model generally has a plurality of moving elements representing the switches and cross-overs, which elements are usually positioned manually but are sometimes operated mechanically from the levers in the machine. The operator can determine from an inspection of the track model how the switches and signals have been or should be set to permit of certain train routes. These track models are generally much shorter than the interlocking machine itself and in comparison take up considerably less space.

The present invention contemplates the elimination from the control tower of the cumbersome interlocking machine and the incorporation of controlling elements in the track model or a control panel which takes the place thereof. This improved control panel, which is substantially no larger than the track model now used, is so constructed that the operator can set up train routes by directly operating the indicating elements on the model itself without the necessity of operating separate control levers as is the present practice.

The actual track switches and signals are operated by electrically actuated mechanism situated adjacent the tracks. Improved circuit controllers, hereinafter disclosed in detail, are provided for operating the various circuits leading to and from the track switch and signal operating mechanism. These circuit controllers are electrically operated by magnets controlled from the contacts on the track model. This system permits of mounting the more or less bulky circuit controllers at any convenient location which can be more advantageously provided at a distance from the control panel in the tower. In this manner the mechanism actually manipulated by the operator is reduced to a convenient size so that it may be more advantageously and economically located with regard to visibility of train movement.

The general object of this invention is to provide an improved controlling mechanism for power operated railway switches and signals, such as briefly described hereinabove and disclosed more in detail in the specifications which follow.

Another object is to provide an improved form of control panel or track model for power operated railway switch and signal mechanism.

Another object is to provide an improved form of circuit controller for use in power-operated railway switch and signal mechanism.

Other objects and advantages of this invention will be more apparent from the following detailed description of one approved form of mechanism capable of carrying out the principles of this invention.

In the accompanying drawings:

Fig. 1 is a plan view of the control panel or track model, or a portion thereof.

Fig. 2 is a vertical section through one of the manually operated indicating and control elements mounted in the panel.

Fig. 3 is a diagrammatic view illustrating the operation of one of the reversing switches, the left-hand half of this view being shown in section taken substantially on the line $3^a$—$3^a$ of Fig. 2, and the right-hand half being taken substantially on the line $3^b$—$3^b$ of Fig. 2.

Fig. 4 is a view similar to Fig. 2 but showing an additional locking mechanism.

Fig. 5 is a side elevation of one of the improved circuit controllers.

Figs. 6 and 6a are transverse vertical sections taken substantially on the line 6—6 of Fig. 5, and showing one of the electro-magnetic operated pawl mechanisms in neutral position and in one of its operative positions respectively.

Figs. 7 and 7a are similar transverse vertical sections taken substantially on the line 7—7 of Fig. 5.

Figs. 8 and 8a are similar vertical sections taken substantially on the line 8—8 of Fig. 5.

Fig. 9 is a transverse vertical section taken substantially on the line 9—9 of Fig. 5.

Fig. 10 is a transverse vertical section taken substantially on the line 10—10 of Fig. 5.

Figs. 11, 12, and 13 are similar views of a portion of the control panel, showing one switch and its accompanying signals in three different, operating positions.

Figs. 14, 15, and 16 are three similar wiring diagrams showing the relative positions of the various contact mechanisms when the operating members on the control panel are in the positions shown in Figs. 11, 12, and 13 respectively.

In general, the apparatus utilized in this system comprises a control panel A, a plurality of circuit controlling devices B, an electrically actuating mechanism C for moving each track switch, and electrically actuated mechanisms D and E for moving the two signal arms pertaining to that switch. It might be here stated that while usually there will be a single control panel A corresponding to the track area to be controlled, there will be one of the control devices B for each group of actuating mechanisms C, D, and E controlling a single switch and the two signals pertaining thereto. However, the several control devices B may be electrically interconnected in various manners in order to secure the desired interlocking control between the various track switches.

The control panel A or track model comprises a panel board 1 which may be mounted either in a vertical or horizontal position and which has indicated on its face a map or design showing the track system to be controlled. The layout shown by way of example in Fig. 1 comprises four parallel main line tracks 2, 3, 4, and 5, and a siding 6 leading from track 5. A crossover switch 7 is adapted to connect tracks 4 and 5, and cross-overs 8 and 9 similarly connect tracks 3 and 4 and 2 and 3 respectively. A switch 10 leads from track 5 to siding 6. Signals 11 and 12 represent the semaphore arms governing traffic over the track 5 and over the siding 6 respectively. Similarly, signals 13 and 14 govern respectively through traffic on track 5 or traffic onto switch 7, and the pairs of signals 15 and 16 and 17 and 18 cooperate with the cross-over switches 8 and 9 respectively. That fragment of the control panel disclosing the entrance to siding 6 and the switch 10 and signals 11 and 12 pertaining thereto is indicated in Figs. 11, 12, and 13. When all of the signals are positioned at right angles to the tracks, as shown in Figs. 1 and 11, the control system is in what is known as "normal" condition, all of the signals being set at danger. When the upper signal 11 is moved into a position parallel with the track 5 as shown in Figs. 12 and 15 the indication is "clear" along track 5, and it will be noted that switch 10 has been moved to the open position so as not to divert traffic onto siding 6. With the lower signal 12 moved parallel to track 5 as shown in Figs. 13 and 16, the indication is clear onto the siding and it will be noted that the switch is now moved so as to divert the traffic onto the siding.

On the control panel A, each of the switch members 7 to 10 inclusive, and each of the signal indicating members 11 to 18 inclusive is in the form of an intermediately pivoted member which may be manually swung to either of the two indicating positions. One of these indicating devices, for example the switch 10, is shown by way of example in Figs. 2, 3, and 4. This device comprises a shaft 19 mounted in a bearing 20 carried by the panel board 1. Additional bearings may be provided for this shaft as may be found necessary. An indicating member 10 corresponding to the section of trackway in the switch leading to siding 6 is mounted on the forward end of shaft 19 so that as the shaft 19 is oscillated this indicating member will be moved from the position shown in Figs. 1 and 13 connecting track 5 with siding 6 to the position shown in Figs. 11 and 12 wherein the switch is open. A knob or handle 21 may be provided on the forward end of shaft 19 to facilitate moving the indicating mechanism to either of the desired positions. It is to be understood that each of the signal indicators 11 and 12 is similarly mounted on an oscillatable shaft journaled in the panel board 1. Mounted on the rear of the panel board is a switch mechanism controlled by the movements of the indicating device. While this switch mechanism may take a variety of forms, it is shown in Figs. 2, 3, and 4 as a reversing switch comprising a drum 22 of insulating material mounted on shaft 19, in the cylindrical surface of which drum are mounted arcuate contact members 23 and 24. A plurality of fixed contact members 25, 26, and 27 are spaced about the drum so that only two of these fixed contacts may engage the arcuate contact 23 at any one time. In a similar manner, fixed contacts 28, 29 and 30 cooperate with the arcuate contact strip 24. These various contacts may be connected up as shown in Fig. 3, wires 31 and 32 leading from a battery 33 or other source of power, and wires 34 and 35 leading from the control panel to one of the circuit controllers B, hereinafter described. In the position shown in Fig. 3, wire 34 will be connected with the positive side of battery 33 through wire 36, contact 27, movable contact 23, fixed contact 26, and wire 31, whereas wire 35 will be connected with the negative side of the battery through wire 37, fixed contact 30, movable contact 24, fixed contact 29, and wire 32. If the shaft 19 is swung through an arc of approximately 90° so as to change the indication on the face of the control panel, the movable contacts 23 and 24 will be moved to the positions shown in dotted lines. Wire 35 will now become the positive lead, being connected with the positive side of the battery through wire 38, fixed contact 25, movable contact 23, fixed contact 26, and wire 31. Wire 34 will now be the negative lead being connected with the negative side of the battery through wire 39, fixed contact 28, movable contact 24, fixed contact 29 and wire 32. It will thus be seen that as the movable indicating member is swung to either of its two indicating positions, the current sent out through leads 34 and 35 will be reversed.

A locking mechanism may be provided for this combined control switch and indicating device, as shown in Fig. 4. A locking plate 40 secured to shaft 19 is provided with one or more spaced locking notches or slots in its periphery, into which is adapted to drop one end 41 of a locking member intermediately pivoted at 42. An armature 43 on the opposite end of this lever is adapted to be attracted by an electro-magnet 44 which may be included in any suitable control circuit. When the magnet 44 is energized, the locking member 41 will be lifted out of engagement with locking plate 40 and the indicating member may be moved. When the actuating circuit of magnet 44 is broken, the locking member will drop into the notch in plate 40 and the indicator and switch device will be locked against movement from this position. A similar locking device may be provided on the circuit controller B, as hereinafter described, and it is ordinarily preferable to locate the locking mechanism on the controller B rather than on the control panel A, since the elimination of these locking devices simplifies the control panel and makes it less cumbersome.

The circuit controller B comprises a drum 45 mounted on a horizontal shaft 46 for step by step oscillation in either direction from the normal position shown in Figs. 5, 6, 7, and 8. On one end portion of this drum is mounted the actuating and locking mechanism hereinafter described and on the other end portion of the drum are mounted the movable contacts of the various electrical switch mechanisms included in the track switch and signal actuating control circuits. As here shown, the right-hand portion of the drum is covered with an annular sleeve of insulating material 47 formed about its periphery with a plurality of spaced longitudinally extending slots 48. An annular contact member 49 is provided with inturned lugs 50 at its ends which may be engaged in a pair of slots 48 to anchor the contact member in any desired position on the drum. In this manner, the timing and operation of the various control switches may be easily adjusted in accordance with the needs of the particular installation. The drum 45 may be of sufficient length to provide any desired number of switches, whereby various hook-ups with the actuating mechanisms C, D, and E, or with other circuit controllers B may be provided as the particular conditions to be controlled may demand. It will be understood that pair of fixed contacts 51 and 52, suitably connected in one of the control circuits, is adapted to cooperate with each of the movable contact members 49.

A pair of oppositely coiled springs 53 and 54, positioned adjacent one end of the drum, have one end of each anchored to a stationary member and the other end connected to the drum. When the drum is oscillated in either direction from the normal position shown in Figs. 5 to 8 inclusive, one of these springs will be tensioned and will return the drum to normal position when the drum is released from the actuating mechanism.

Three separate actuating mechanisms F, G, and H are provided to impart successive step-by-step rotating movements to the drum in either direction from normal. The actuating mechanism F comprises a pair of electro-magnets 55 and 56 which respectively cooperate with the opposite arms of an armature 57 intermediately pivoted at 58. When a current is set through the magnets in one direction the armature 57 will be tilted as shown in Fig. 6a, and when this current is reversed the armature will be tilted in the opposite direction, in a well known manner. A pair of similar actuating pawls 59 and 60 are mounted one at each end of armature 57. Each pawl is pivotally mounted on the armature at 61, and a spring 62 holds a laterally projecting arm 63 formed on the pawl in engagement with the upper face of lever 57 so that the pawl normally projects at substantial right angles to the armature as shown in Fig. 6. However, the pawl is capable of swinging away from the armature after it has engaged with the lug or tooth on the drum, as shown at the right of Fig. 6a. The pawls 59 and 60 are adapted to cooperate with a pair of ratchet teeth or lugs 64 and 65 respectively, positioned at substantially diametrically opposite sides of the drum 45. The first swinging movement of lever 57 will bring one of the pawls into engagement with the corresponding ratchet lug and further swinging movement of the armature lever in the same direction will cause the pawl to rotate the drum a predetermined distance in one direction, as shown in Fig. 6a.

The second actuating mechanism G is in all essential respects the same as the mechanism F already described. It will be noted that the actuating mechanism G is offset longitudinally of the drum from the mechanism F, and that the ratchet lugs 66 and 67 with which the pawls 68 and 69 respectively of mechanism G cooperate are angularly spaced about the periphery of the drum so that after the drum 45 has been moved one step in a predetermined direction by the mechanism F, one of the lugs 66 or 67 will have been moved into position to be engaged by the pawl 68 or 69 of mechanism G so that the drum can be rotated another step in the same direction.

The third actuating mechanism H is in the form of a solenoid 70, the core 71 of which is forked at its upper end to provide a pair of upwardly projecting rigid pawls 72 and 73 adapted to cooperate respectively with the ratchet lugs 74 and 75 formed on drum 45. These lugs 74 and 75 are positioned on drum 45 in staggered relation to the lugs 64, 65, and 66, 67, as shown in Figs. 5 and 6, so that one of these lugs will be in position to be engaged by pawl 72 or pawl 73 after the drum has been rotated two successive steps in either direction by the other actuating mechanisms F and G. The solenoid 70 may be provided with a plurality of independent windings, two such windings 76 and 77 being illustrated in the example here shown. A locking mechanism may be provided, similar to the locking mechanism already shown in Fig. 4, for positively holding drum 45 in one or more selected positions until certain predetermined prior operations have been accomplished. In the example here shown, the locking lever 78 intermediately pivoted at 79 has an armature 80 at one end adapted to be attracted by an electro-magnet 81 in order to release the locking means. The latch 82 at the opposite end of lever 78 is adapted to drop into one or more locking notches or recesses formed in the adjacent end of drum 45.

It will now be apparent that the control drum 45 may be rotated three successive steps in either direction from its normal position by the successive operation of the mechanisms F, G, and H, and these successive rotative movements will cause the making and breaking in proper sequence of a plurality of different actuating circuits controlled by the contact strips 49 and cooperating fixed contacts 51 and 52 which have been suitably positioned on the opposite end portion of the drum. When the actuating mechanism H and the locking mechanism 78 have both been released, the drum is permitted to rotate back to its normal position under the influence of either of the springs 53 or 54. It will be evident that the yieldable pawls of the actuating mechanisms F and G will permit the cooperating ratchet lugs on the drum to rotate under these pawls in one direction but not in the other direction.

The control and actuating circuits governed by the panel board A and the circuit controllers B may be hooked up in a variety of different manners depending upon the demands of the particular track situation to which the apparatus is adapted. One example for the operation of a single switch and its accompanying signals is illustrated diagrammatically in Figs. 11 to 16 inclusive. Fig. 11 shows the position of the indicating members on the control panel, and Fig. 14 is a wiring diagram indicating the corresponding position of the various contact members in the system. It will be noted that the switch and signals are shown in the same position in Fig. 14 as are indicated by the indicating members on the panel shown in Fig. 11. In similar manner, Figs. 12, 15 and Figs. 13, 16, show subsequent steps in the operation.

In order to clear the main line track 5 for traffic, the operator has moved the switch indicating member 10 from the position shown in Fig. 1 to the position shown in Fig. 11. This movement of indicating member 10 has closed the reversing contacts indicated diagrammatically at 84, located on the back of the panel board so as to cause a current to flow from battery 85 (corresponding to battery 33 in Fig. 3) in the proper direction to energize the actuating magnets F so as to rotate the drum B a step in one direction thus closing the contacts 86 which are positioned on the drum and sending a current from battery 87 in the proper direction to cause the mechanism C to open the switch 88, that is move this switch to the position indicated by member 10 on the panel board. After mechanism C has moved switch 88 to the open position and locked it away from the main line 5, this mechanism C closes contacts 89 so as to send a current from battery 90 in the proper direction to energize the actuating mechanism G so as to move drum B another step in the same direction. This movement closes a contact 91 positioned on the drum so as to connect a battery 92 with one of the coils 76 of the third actuating mechanism H. However, this circuit is still open at the contact 93 which is controlled by the signal indicating arm 11 on the panel board A. This lever arm 11 is now turned by the operator to the position shown in Fig. 12. This serves to close a pair of contacts 93 and 94 and open a contact 95, all of which may be controlled directly by the indicating member 11 on the panel board. The energizing circuit for coil 76 of actuating mechanism H is now completed so that this mechanism will notch the drum B another step in the same direction as before thus closing contact 96 on the drum and completing a circuit from battery 92 to the control relay 97 which causes the actuating mechanism D to move the semaphore signal arm 98 to the position shown in Fig. 15 which corresponds with the position of the indicating member 11 in Fig. 12. The opening of switch 95 has broken the actuating circuit for lock magnet 81 so that locking lever 78 has fallen into a notch in drum 45 and has locked the circuit controller B in this final position. The track switch is now open and the signal indicates clear for traffic along track 5, and the control mechanism is all locked in this final position.

Now in order to set up a traffic route from main line 5 onto the siding 6, the operator first turns signal indicating lever 11 on the panel board back to the danger position shown in Figs. 11 and 13. This breaks the circuit at contact 93 to the actuating coil 76 of mechanism H so as to deenergize this solenoid and also breaks the circuit to control relay 97 so that mechanism D will move the signal arm 98 back to danger position. At the same time contact 95 is closed so as to complete the circuit to locking magnet 81 and release the lock 78 from the drum 45. The operator can now move the switch indicating arm 10 on the panel board to the position shown in Fig. 13. During the movement of this member the contacts are momentarily broken at 84, and a relay 99 is also momentarily deenergized so as to open the circuit to actuating mechanism G, so that both of the magnetic actuating mechanisms F and G will be deenergized so as to return these mechanisms to neutral position and permit the drum 45 of circuit controller B to snap back to its neutral position, as shown in Fig. 5. The final movement of indicating member 10 will close the contacts 84 as shown in Fig. 16 so as to energize mechanism F and step the drum 45 around in the opposite direction so as to close contacts 86 and cause mechanism C to be actuated so as to move the switch 88 to the closed position shown in Fig. 6 and indicated by the present position of member 10 on the panel board. When the switch has been locked in this position by the mechanism C, the contacts 89 will be closed so as to send a current from battery 90 in the proper direction to energize actuating mechanism G and move the drum 45 an additional step in this reverse direction thus moving contact 91 on the drum so as to connect coil 77 of actuating mechanism H with the battery 92. However, this circuit is still open at contact 100. Signal arm 12 on the panel board is now moved to the clear position shown in Fig. 13 thus serving to close contact 100 and 101 and open contact 102. This causes mechanism H to be energized to rotate the drum of circuit closure B, the third step in this reverse direction, thereby causing contact 103 on the drum to be closed and completing a circuit to control relay 104 which causes the mechanism E to be actuating to move the semaphore arm 105 to the clear position shown in Fig. 16 and corresponding to the position indicated by arm 12 on the panel board. At the same time the actuating circuit for locking magnet 81 is broken at contact 102 and the locking mechanism will engage the drum to hold the parts in this final position. The signal for the siding is now at clear and the switch is in the proper position to divert traffic onto the siding 6.

It is to be understood that the number of energizing coils on the actuating magnet H may be varied in accordance with the complexity of the signal system. The control systems for other track switches and the signals pertaining thereto may be interconnected with the control system for the switch and signals here illustrated in order to provide for a certain prescribed sequence of operations between the two or more track switches.

To recapitulate, it will now be apparent that all of the mechanism under the direct control of the operator is positioned on the track model or control panel, which serves the double purpose of indicating the position of the track and signal system and also serving as a means for correctly positioning this system for different traffic conditions. This control panel is the only portion of the apparatus that need be situated in the operator's tower, thereby effecting a great economy in space and simplifying the manual operations required. The operator's attention within the tower is concentrated on a single small area, the face of the control panel, and he is allowed more time and increased visibility for observing train movements from his position within the tower. It will also be apparent that the individual elements on the control panel are independent, (except for wiring connections) and hence the panel can be made in any desired shape or size, and may be curved or sectional so as to fit the available space and bring all parts thereof into easy reach of the operator.

While one example has been disclosed of a system to which this improved control apparatus may be applied, the exact construction of the apparatus and the circuits in which these parts are hooked up can be varied greatly without departing from the principles of this invention. While a form of reversing switch has been illustrated by way of example in Figs. 2, 3, and 4 as operated by one of the indicating members on the panel board, any other desired form of switch or circuit breaking mechanism might be operated in a similar manner from one of these indicating members. This switch may involve a single movable contact for making and breaking one circuit, or may be provided with a plurality of independent contacts for simultaneously making and breaking a plurality of circuits. It will also be apparent that the number and the character of the switches or circuit breakers that are mounted on drum B and controlled by the movements of this drum may be varied as conditions may require.

I claim:

1. In power operated railway switch and signal mechanism, a control panel comprising a panel board with the track layout indicated on the face thereof, a plurality of manually movable indicating members on the face of the panel corresponding to the various track switches and signals to be controlled, and electric switches comprising contact members movable with the indicating members for controlling the several operating circuits.

2. In power operated railway switch and signal mechanism, a control panel comprising a panel board with the track layout indicated on the face thereof, a plurality of manually movable control members corresponding to the several track switches and signals to be controlled, each control member comprising a manually oscillatable shaft journaled in the panel, an indicating member secured to the shaft and movable on the face of the panel to cooperate with the track layout indicated thereon, and an electric switch mechanism carried by the panel and comprising a contact carried by the shaft and movable therewith.

3. In power operated railway switch and signal mechanism, a control panel comprising a panel board with the track layout indicated on the face thereof, a plurality of manually movable control members corresponding to the several track switches and signals to be controlled, each control member comprising a manually oscillatable shaft journaled in the panel, an indicating member secured to the shaft and movable on the face of the panel to cooperate with the track layout indicated thereon, and an electric switch mechanism mounted on the rear of the panel and comprising a contact member carried by the rear portion of the shaft.

4. In power operated railway switch and signal mechanism, a control panel comprising a panel board with the track layout indicated on the face thereof, a plurality of manually movable control members corresponding to the several track switches and signals to be controlled, each control member comprising a manually oscillatable shaft journaled in the panel, an indicating member secured to the shaft and movable on the face of the panel to cooperate with the track layout indicated thereon, and an electric switch mechanism mounted on the rear of the panel and comprising a drum mounted on the rearwardly projecting portion of the shaft, contact members on the drum, and a plurality of stationary contacts cooperating with the movable contacts on the drum.

5. In power operated railway switch and signal mechanism, a control panel comprising a panel board with the track layout indicated on the face thereof, a plurality of manually movable control members corresponding to the several track switches and signals to be controlled, each control member comprising a manually oscillatable shaft journaled in the panel, an indicating member secured to the shaft and movable on the face of the panel to cooperate with the track layout indicated thereon, an electric switch mechanism carried by the panel and comprising a contact carried by the shaft and movable therewith, and means for automatically locking the shaft in certain predetermined positions.

6. In power operated railway switch and signal mechanism, a control panel comprising a panel board with the track layout indicated on the face thereof, a plurality of manually movable control members corresponding to the several track switches and signals to be controlled, each control member comprising a manually oscillatable shaft journaled in the panel, an indicating member secured to the shaft and movable on the face of the panel to cooperate with the track layout indicated thereon, an electric switch mechanism carried by the panel and comprising a contact carried by the shaft and movable therewith, and electrically controlled means for automatically locking the shaft in certain predetermined positions.

7. In power operated railway switch and signal mechanism, a circuit-controlling device comprising a rotatable drum, a plurality of contact members carried by the drum, fixed contact members cooperating with the contacts on the drum to control the various circuits, electrically actuated means for imparting a step by step rotation to the drum in either direction from a normal position, and separate means for automatically returning the drum directly to normal position from the position reached by the step by step rotation.

8. In power operated railway switch and signal mechanism, a circuit-controlling device comprising a rotatable drum, a plurality of contact members carried by the drum, fixed contact members cooperating with the contacts on the drum to control the various circuits, electrically actuated means for imparting a step by step rotation to the drum in either direction from a normal position and electrically controlled means for locking the drum in certain predetermined positions.

9. In power operated railway switch and signal mechanism, a circuit-controlling device comprising a rotatable drum, a plurality of contact members carried by the drum, fixed contact members cooperating with the contacts on the drum to control the various circuits, electrically actuated means for imparting a step by step rotation to the drum in either direction from a normal position comprising two series of ratchet lugs positioned on diametrically opposite sides of the drum, and a plurality of electrically actuated pawls one for each lug for independently and successively engaging the lugs.

10. In power operated railway switch and signal mechanism, a circuit-controlling device comprising a rotatable drum, a plurality of contact members carried by the drum, fixed contact members cooperating with the contacts on the drum to control the various circuits, electrically actuated means for imparting a step by step rotation to the drum in either direction from a normal position comprising a plurality of pairs of ratchet lugs positioned with one of each pair at each side of the drum, the lugs at each side of the drum being positioned in staggered relation, a pair of electrically actuated pawls for each pair of lugs adapted to selectively engage the pawls to rotate the drum one step by each pawl in one direction or the other and independently operated electro-magnets for actuating the pawls of each pair.

11. In power operated railway switch and signal mechanism, a circuit-controlling device comprising a rotatable drum, a plurality of contact members carried by the drum, fixed contact members cooperating with the contacts on the drum to control the various circuits, electrically actuated means for imparting a step by step rotation to the drum in either direction from a normal position comprising a plurality of pairs of ratchet lugs positioned with one of each pair at each side of the drum, the lugs at each side of the drum being positioned in staggered relation, a pair of electrically actuated pawls for each pair of lugs adapted to selectively engage the pawls to rotate the drum one step by each pawl in one direction or the other, and independently operated electro-magnets for actuating the pawls of each pair, and means for automatically returning the drum directly to normal position when released from the pawls.

12. In power operated railway switch and signal mechanism, a circuit-controlling device comprising a rotatable drum, a plurality of contact members carried by the drum, fixed contact members cooperating with the contacts on the drum to control the various circuits, electrically actuated means for imparting a step by step rotation to the drum in either direction from a normal position comprising a pair of lugs positioned one at either diametrically opposed side of the drum, an intermediately pivoted armature, a pair of pawls mounted one at either end of the armature and adapted to selectively engage the lugs, and a pair of electro-magnets of reversible polarity positioned to selectively tilt the armature in either direction.

13. In power operated railway switch and signal mechanism, the combination with the electrically actuated means for moving the several track switches and the signals pertaining thereto, of a control panel comprising a panel board with the track layout indicated thereon, a plurality of manually movable indicating members on the face of the panel corresponding to the various track switches and signals, and mechanism controlled by the movements of the indicating members for causing the switch and signal moving means to be actuated in the proper order.

14. In power operated railway switch and signal mechanism, the combination with the electrically actuated means for moving the several track switches and the signals pertaining thereto, of a control panel comprising a panel board with the track layout indicated thereon, a plurality of manually movable indicating members on the face of the panel corresponding to the various track switches and signals, and electrically actuated mechanism electrically controlled from the movements of the indicating members for causing the switch and signal moving means to be actuated in the proper order.

15. In power operated railway switch and signal mechanism, the combination with mechanism for moving the track switches and signals of a control panel comprising a panel board with the track layout indicated on the face thereof, a plurality of manually movable indicating members on the face of the panel corresponding to the various track switches and signals to be controlled, and electric switches comprising contacts movable with the indicating members, a plurality of movable circuit closing devices, one for each track switch and the signals pertaining thereto, and a plurality of electrically actuated means for imparting successive movements to each circuit closing device, the actuating circuits for these several means being controlled by the switches on the panel board, and the movements of the track switch operating mechanism.

16. In power operated railway switch and signal mechanism, the combination with mechanism for moving the track switches and signals of a control panel comprising a panel board with the track layout indicated on the face thereof, a plurality of manually movable indicating members on the face of the panel corresponding to the various track switches and signals to be controlled, and electric switches comprising contacts movable with the indicating members, a plurality of circuit closing devices, one for each track switch and the signals pertaining thereto, each device comprising a rotatable drum, a plurality of contact members on the drum, fixed contact members cooperating with the contacts on the drum to control the switch and signal operating circuits, and a plurality of electrically operated means for imparting step by step rotation to the drum, the actuating circuits for these several means being controlled by the switches on the panel board and the movements of the track switch operating mechanism.

17. In power operated railway switch and signal mechanism, the combination with mechanism for moving the track switches and signals of a control panel comprising a panel board with the track layout indicated on the face thereof, a plurality of manually movable indicating members on the face of the panel corresponding to the various track switches and signals to be controlled, and electric switches comprising contacts movable with the indicating members, electrically actuated means for moving the track switches and signals, a plurality of circuit closing devices, one for each track switch and the signals pertaining thereto, each device comprising movable and fixed contacts for controlling the actuating circuits for the track and signal moving mechanism, and a plurality of electrically actuated means for imparting successive movements to each circuit closing device, these several means being controlled by the switches on the control panel and the track switch operating mechanism.

18. In power operated railway switch and signal mechanism, the combination with mechanism for moving the track switches and signals of a control panel comprising a panel board with the track layout indicated on the face thereof, a plurality of manually movable indicating members on the face of the panel corresponding to the various track switches and signals to be controlled, and electric switches comprising contacts movable with the indicating members, electrically actuated means for moving the track switches and signals, a plurality of circuit closing devices, one for each track switch and the signals pertaining thereto, each device comprising a rotatable drum, a plurality of contact members on the drum, fixed contacts cooperating with the contacts on the drum for controlling the actuating circuits for the switch and signal moving mechanism, and a plurality of electrically actuated means for imparting a step by step rotation to the drum, the actuating circuits for these several means being controlled by the switches on the control panel and the movements of the track switch operating mechanism.

19. In power operated railway switch and signal mechanism, a circuit-controlling device comprising a rotatable drum, a plurality of contact members carried by the drum, fixed contact members cooperating with the contacts on the drum to control the various circuits, and means for imparting a step by step rotation to the drum in either direction from a normal position comprising two series of ratchet lugs positioned on the drum, a plurality of pawls, one for each lug, and means for independently actuating each pawl.

20. In power operated railway switch and signal mechanism, a circuit-controlling device comprising a rotatable drum, a plurality of contact members carried by the drum, fixed contact members cooperating with the contacts on the drum to control the various circuits, and electrically actuated means for imparting a step by step rotation to the drum in either direction from a normal position comprising two series of ratchet lugs positioned on the drum, a plurality of pawls, one for each lug, and electro-magnetically actuated means for independently operating each pawl.

21. In power operated railway switch and signal mechanism, a circuit-controlling device comprising a rotatable drum, a plurality of contact members carried by the drum, fixed contact members cooperating with the contacts on the drum to control the various circuits, and means for imparting a step by step rotation to the drum in either direction from a normal position comprising two series of ratchet lugs positioned on the drum, a plurality of pawls, one for each lug, means for independently actuating each pawl and means for returning the drum directly to normal position from the position reached by the step by step rotation.

22. In power operated railway switch and signal mechanism, a circuit-controlling device comprising a rotatable drum, a plurality of contact members carried by the drum, fixed contact members cooperating with the contacts on the drum to control the various circuits, and electrically actuated means for imparting a step by step rotation to the drum in either direction from a normal position comprising two series of ratchet lugs positioned on the drum, a plurality of pawls, one for each lug, electro-magnetically actuated means for independently operating each pawl, and means for returning the drum directly to normal position from the position reached by the step by step rotation.

LEROY WYANT.